(12) United States Patent
Cloud

(10) Patent No.: US 12,710,608 B2
(45) Date of Patent: Aug. 18, 2026

(54) GROMMET FOR A SPLICE ENCLOSURE AND A SPLICE ENCLOSURE INCLUDING A GROMMET

(71) Applicant: Preformed Line Products Co., Mayfield Village, OH (US)

(72) Inventor: Randy G Cloud, Mentor, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 286 days.

(21) Appl. No.: 18/575,163

(22) PCT Filed: Jun. 30, 2022

(86) PCT No.: PCT/US2022/035693
§ 371 (c)(1),
(2) Date: Dec. 28, 2023

(87) PCT Pub. No.: WO2023/278680
PCT Pub. Date: Jan. 5, 2023

(65) Prior Publication Data

US 2024/0310594 A1 Sep. 19, 2024

Related U.S. Application Data

(60) Provisional application No. 63/217,090, filed on Jun. 30, 2021.

(51) Int. Cl.
*G02B 6/44* (2006.01)

(52) U.S. Cl.
CPC ....... *G02B 6/4444* (2013.01); *G02B 6/44465* (2023.05); *G02B 6/4454* (2013.01); *G02B 6/44775* (2023.05)

(58) Field of Classification Search
CPC .............. G02B 6/4444; G02B 6/44465; G02B 6/4454; G02B 6/44775
See application file for complete search history.

(56) References Cited

U.S. PATENT DOCUMENTS 6,314,229 B1 * 11/2001 Sasaki .................. G02B 6/4444 385/135
7,442,884 B2 * 10/2008 Ball ..................... H02G 15/113 16/2.2

(Continued)

FOREIGN PATENT DOCUMENTS

WO 2021061988 A1 4/2021

OTHER PUBLICATIONS

International Search Report of Corresponding Application No. PCT/US2022/035693; Oct. 25, 2022; 5 Pgs.

*Primary Examiner* — Ryan A Lepisto
(74) *Attorney, Agent, or Firm* — Cooper Legal Group, LLC

(57) ABSTRACT

A grommet for sealing a first aperture formed in a splice enclosure includes a body that is receivable within the first aperture, and is subjected to a compressive force exerted by a sidewall of the splice enclosure defining the first aperture while the grommet is installed within the first aperture. The body defines a passage extending from a first end of the body to a second end of the body. A collar is coupled to a sidewall of the body defining the passage. The collar defines a second aperture that is closed as a result of the compressive force exerted on the sidewall. The collar is deformable to receive the cable within the second aperture while the grommet is installed within the first aperture to seal an interface between the collar and the cable.

20 Claims, 5 Drawing Sheets

(56) References Cited

U.S. PATENT DOCUMENTS

| | | | | |
|---|---|---|---|---|
| 7,668,431 | B2 * | 2/2010 | Cox | G02B 6/44775 385/134 |
| 8,033,408 | B2 * | 10/2011 | Makela | H02G 3/088 174/152 G |
| 8,718,434 | B2 * | 5/2014 | Gronvall | G02B 6/44465 385/139 |
| 8,921,693 | B2 * | 12/2014 | Benedetto | G02B 6/44465 361/600 |
| 8,985,533 | B2 * | 3/2015 | Edmond | F16L 3/1222 248/74.1 |
| 9,719,614 | B2 * | 8/2017 | Blaser | G02B 6/4444 |
| 10,656,358 | B2 * | 5/2020 | Bandy | G02B 6/44465 |
| 10,935,135 | B2 * | 3/2021 | Kempeneers | H02G 3/088 |
| 12,095,244 | B2 * | 9/2024 | Vastmans | G02B 6/4444 |
| 2008/0066949 | A1 * | 3/2008 | Cloud | G02B 6/44785 174/153 G |
| 2020/0192043 | A1 * | 6/2020 | Geens | G02B 6/4444 |
| 2023/0280540 | A1 * | 9/2023 | Etheridge | G02B 6/4441 385/137 |
| 2024/0288655 | A1 * | 8/2024 | Ciesielczyk | G02B 6/501 |

* cited by examiner

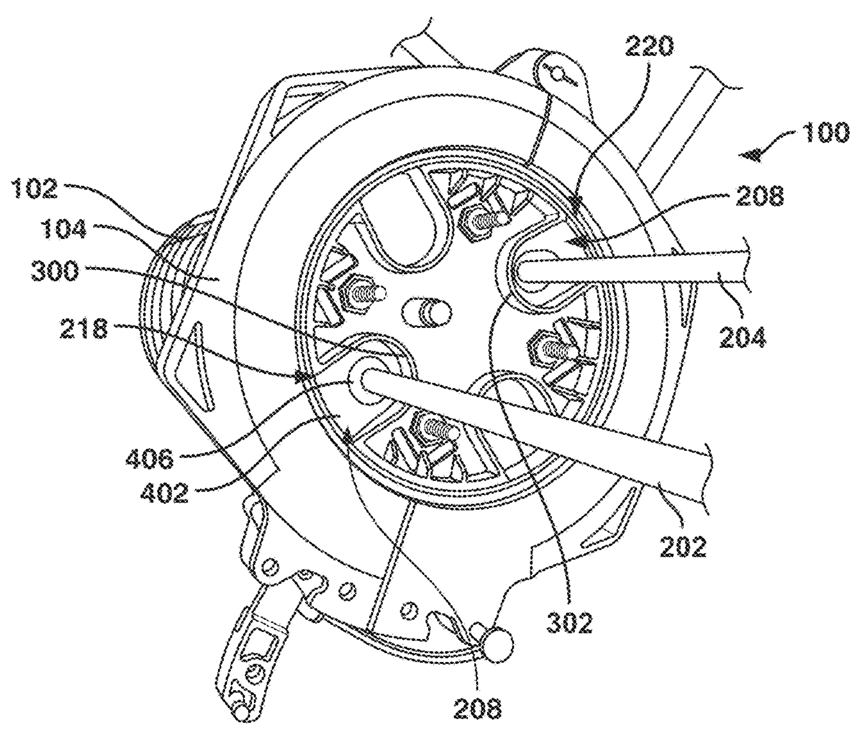
FIG. 3
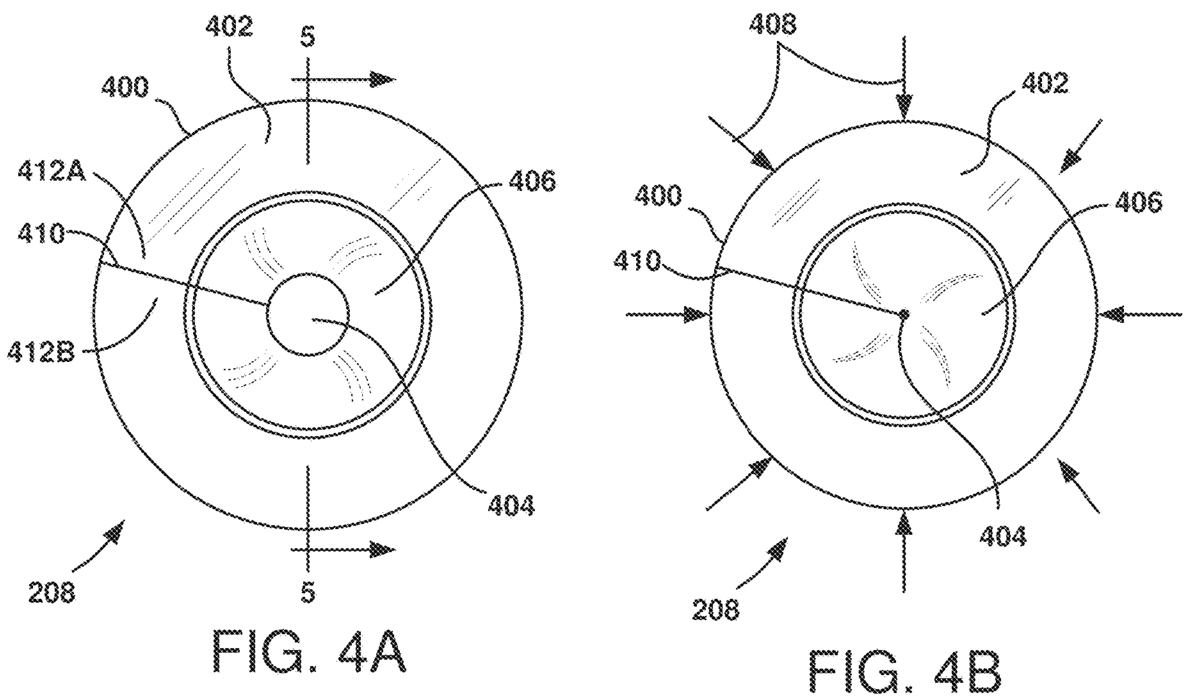
FIG. 4A
FIG. 4B

GROMMET FOR A SPLICE ENCLOSURE AND A SPLICE ENCLOSURE INCLUDING A GROMMET

TECHNICAL FIELD

The instant application is generally directed towards a grommet for sealing a port of a splice enclosure through which a cable is to extend, and a splice enclosure including such a grommet. For example, the grommet described herein can define a passage extending into an interior of the splice enclosure. A deformable collar provided to the grommet seals the passage, without requiring a separable plug inserted into the passage, when a cable is not extended into the splice enclosure through the grommet.

BACKGROUND

Cables, such as fiber optic cables for example, are deployed to form a network of communication channels over which computers, telephones, electronic devices, etc. can communicate. To satisfy an ever-growing demand for such communication channels, fiber optic cables often include many individual fibers. An individual fiber from a first fiber optic cable can be selectively connected to another fiber included in a second fiber optic cable at a splice enclosure, which is commonly referred to as a "dome."

The fiber optic cables, or portions thereof, extend from an ambient environment into the splice enclosure where the individual fibers are to be connected. Water, dirt, or other contaminants within the interior of the splice enclosure can potentially interfere with the connections between fiber optic cables.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to some embodiments, a grommet for sealing a first aperture formed in a splice enclosure to receive a cable extending into the splice enclosure includes a body formed from a first material. The body is receivable within the first aperture formed in the splice enclosure, and is sized to be subjected to a compressive force exerted by a sidewall of the splice enclosure defining the first aperture while the grommet is installed within the first aperture. The body defines a passage extending from a first end of the body to a second end of the body. A collar formed from a second material, different than the first material, is coupled to a sidewall of the body defining the passage and extending through the body. The collar defines a second aperture that is closed as a result of the compressive force exerted on the sidewall. The collar is deformable to receive the cable within the second aperture while the grommet is installed within the first aperture, to seal an interface between the collar and the cable.

According to some embodiments, a rigidity of the second material forming the collar is less than a rigidity of the first material forming the body. The rigidity of the second material allows a portion of the collar to be compressed in a radial direction, relative to a central axis of the second aperture, as a result of the cable being received within the second aperture and the grommet being installed in the first aperture defined by the splice enclosure.

According to some embodiments, the collar is deformable to seal the interface between the collar and a non-cylindrical exterior surface of the cable.

According to some embodiments, the second aperture defined by the collar is cylindrical, and the collar is deformable to close the second aperture in a radial direction relative to an axis of the second aperture extending in a direction parallel to an axis of the body. The axis of the body extends between the first end of the body and the second end of the body.

According to some embodiments, the second aperture is closed to form a water-tight seal at atmospheric pressure as a result of the compressive force being exerted on an exterior surface of the body by the sidewall defining the first aperture, without a plug inserted into the second aperture.

According to some embodiments, the collar includes a base coupled to an interior surface defining a portion of the passage defined by the body, and a tapered region extending between the base and a peak region disposed radially inward of the interior surface.

According to some embodiments, the body includes a rectangular cross-sectional shape, and the passage is cylindrical, extending through the body.

According to some embodiments, a splice enclosure includes a housing defining an interior space. A cap is to be provided to the housing to seal the interior space. The cap defines a first aperture through which a cable is to extend between an ambient environment and the interior space. A grommet is to seal a space between a sidewall of the cap that defines the first aperture and an exterior surface of the cable extending into the interior space. The grommet includes a body having an external periphery that is receivable within the first aperture. The external periphery of the body is sized to be subjected to a compressive force exerted by the sidewall while the grommet is installed within the first aperture. The body defines a passage extending from a first end of the body exposed to the ambient environment to a second end of the body exposed to the interior space while the grommet is installed within the first aperture. A collar is coupled to a sidewall of the body defining the passage. The collar defines a second aperture that is closed as a result of the compressive force exerted on the sidewall. The collar is deformable to receive the cable within the second aperture while the grommet is installed within the first aperture to seal an interface between the collar and the cable.

According to some embodiments, the body is formed from a first material and the collar is formed from a second material, different from the first material. A rigidity of the second material is less than a rigidity of the first material, causing a portion of the collar to be compressed in a radial direction, relative to a central axis of the second aperture as a result of the cable being received within the second aperture.

According to some embodiments, the collar is deformable to seal the interface between the collar and a non-cylindrical exterior surface of the cable.

According to some embodiments, the second aperture defined by the collar is cylindrical, and the collar is deformable to close the second aperture in a radial direction relative to an axis of the second aperture extending in a direction parallel to an axis of the body. The axis of the body extends in a direction from the first end of the body and the second end of the body.

According to some embodiments, the second aperture is closed to form a water-tight seal at atmospheric pressure as a result of the compressive force being exerted on an exterior surface of the body by the sidewall defining the first aperture, without a plug being inserted into the second aperture.

According to some embodiments, the collar includes a base coupled to an interior surface defining a portion of the passage defined by the body, and a tapered region extending between the base and a peak region disposed radially inward of the interior surface.

According to some embodiments, the body includes a rectangular cross-sectional shape, and the passage is cylindrical, extending through the body.

According to some embodiments, a splice enclosure includes a housing defining an interior space, and a cap provided to the housing to seal the interior space. The cap defines a first aperture leading from an ambient environment to the interior space. A cable extends through the first aperture between the ambient environment and the interior space. A grommet is installed within the first aperture to seal a space between an external surface of the cable and a sidewall of the cap defining the first aperture. The grommet includes a body having an external periphery that is subjected to a compressive force exerted by the sidewall. The body defines a passage extending from a first end of the body exposed to the ambient environment to a second end of the body exposed to the interior space. A collar is coupled to a sidewall of the body defining the passage. The collar defines a second aperture that closes as a result of the compressive force being applied. The collar is deformed to receive the cable and seal an interface between the external surface of the cable and a sidewall of the collar defining the second aperture.

According to some embodiments, the body is formed from a first material and the collar is formed from a second material, different from the first material. A rigidity of the second material is less than a rigidity of the first material, causing a portion of the collar to be compressed in a radial direction, relative to a central axis of the second aperture as a result of the cable being received within the second aperture.

According to some embodiments, the collar is deformable to seal the interface between the collar and a non-cylindrical exterior surface of the cable.

According to some embodiments, the second aperture defined by the collar is cylindrical, and the collar is deformable to close the second aperture in a radial direction relative to an axis of the second aperture extending in a direction parallel to an axis of the body. The axis of the body extends between the first end of the body and the second end of the body.

According to some embodiments, the second aperture is closed to form a water-tight seal at atmospheric pressure as a result of the compressive force being exerted on an exterior surface of the body by the sidewall defining the first aperture, without a plug being inserted into the second aperture.

According to some embodiments, the collar includes a base coupled to an interior surface defining a portion of the passage defined by the body, and a tapered region extending between the base and a peak region disposed radially inward of the interior surface.

According to some embodiments, the body includes a rectangular cross-sectional shape, and the passage is cylindrical, extending through the body.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DESCRIPTION OF THE DRAWINGS

FIG. 3 is a perspective view of a cap installed on a housing of a splice enclosure, the cap including a plurality of ports through which cables extend into an interior of the housing sealed by grommets;

FIG. 4A is an end view of a grommet to be installed within a port defined by a portion of a splice enclosure, to seal a space between a cable extending into an interior of the splice enclosure and a surface of the splice enclosure defining the port, wherein the grommet is unbiased and a passage extending through the grommet is open;

FIG. 4B is an end view of the grommet of FIG. 4A, compressed as a result of being installed within the port defined by the splice enclosure, wherein the passage defined by the grommet is closed as a result of the grommet being compressed;

DETAILED DESCRIPTION

Figure 1:
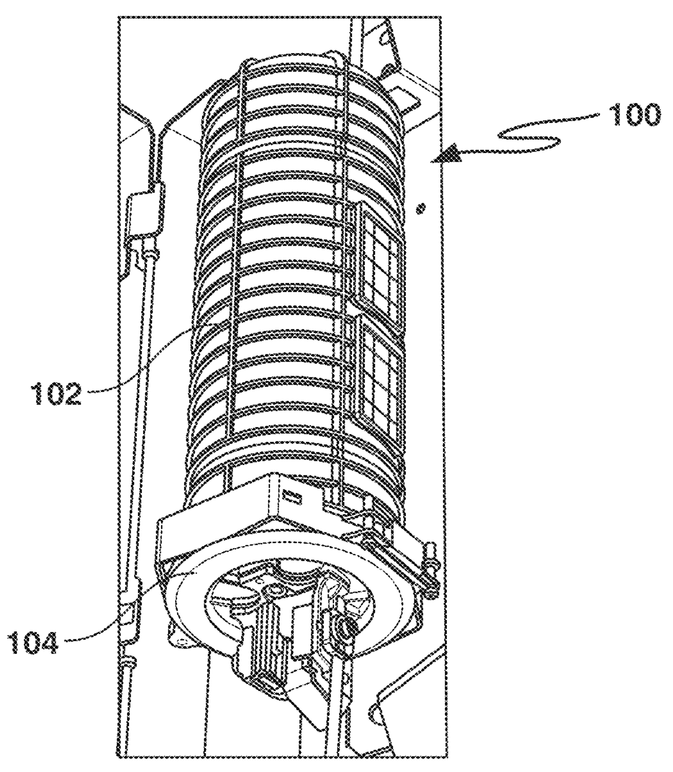
FIG. 1 is a perspective view of an embodiment of a splice enclosure mounted on a support structure.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

A splice enclosure includes a housing defining an interior space in which a connection between a first cable and a second cable is to be supported. A cap encloses the interior space and includes a first port through which the first cable enters the interior space and a second portion through which the second cable enters the interior space. Because a contaminant such as water, dirt or other debris within the interior space can interfere with the connection between the first cable and second cable, or degrade components of the splice enclosure, the first port and second port are sealed by grommets.

A grommet for sealing a port of a splice enclosure through which a cable is to extend, and a splice enclosure including such a grommet, are disclosed herein. For some embodiments, the grommet includes a body that defines a passage extending into an interior of the splice enclosure. A collar formed from an elastically-compressible material is disposed within the passage, and defines an aperture through which a cable is to be received. Examples of materials include silicone, or urethane or TPE (thermoplastic elastomer) or TPR (thermoplastic rubber). Such materials may be critical (and not merely a matter of design choice) as they might allow for desired, compression, expansion, malleability, etc. Of course, other materials are contemplated and within the scope of the present disclosure. The collar is deformable to seal the passage without requiring a separable plug to be inserted into the aperture defined by the collar when a cable is not extended into the splice enclosure through the grommet. The collar is deformable to receive the cable within the aperture, and seal a space between a wall defining a perimeter of the port and the external surface of the cable.

Referring now to the drawings, FIG. 1 is a perspective view of an embodiment of a splice enclosure 100. The illustrated embodiment of the splice enclosure includes a housing 102 that defines an interior space in which a connection between at least a first cable 202 (FIG. 2) and a second cable 204 (FIG. 2) is to be enclosed. The housing 102 is formed from any suitably-durable material that can withstand the environmental conditions where the splice enclosure 100 is to be installed. An example of a material for the housing 102 includes, but is not limited to, plastics such as ultraviolet-resistant, thermosetting polymers, and the like. Examples of materials include silicone, or urethane or TPE (thermoplastic elastomer) or TPR (thermoplastic rubber). Such materials may be critical (and not merely a matter of design choice) as they might allow for desired, compression, expansion, malleability, etc. Of course, other materials are contemplated and within the scope of the present disclosure.

A cap 104 encloses an opening formed in the housing 102, leading into the interior space. Embodiments of the cap 104 cooperate with the opening formed in the housing 102 leading into the interior space. Some embodiments of the cap 106 include a compressible gasket 206 (FIG. 2), facilitating the formation of an air-tight enclosure as a result of cooperation between the housing 102 and the cap 104, at atmospheric pressure, or up to a threshold pressure that is greater than atmospheric pressure. For example, embodiments of the threshold pressure can be at least 20 psi, or at least 25 psi, or at least 30 psi, or at least 35 psi, or at least 40 psi, etc.

It is to be appreciated that, within some examples, the housing 102 and/or the cap 104, and portions thereof, may be pre-existing structures. Within some examples, the housing 102 and/or the cap 104, and portions thereof, may be of pre-existing design. Within some examples, the housing 102 and/or the cap 104, and portions thereof, may be new structures. Within some examples, the housing 102, the cap 104, and/or portions thereof, may be of a new design. As such, it is to be appreciated that the specifics of the housing 102, the cap 104 and/or portions thereof need not be limitations upon the present disclosure.

The first cable 202 and the second cable 204 are shown as fiber optic cables within a flexible, dielectric jacket. However, according to some embodiments, the first cable 202 and the second cable 204 are optical ground wire "OPGW" cables introduced into the housing 102 through ports as described herein, or any other such cable. The OPGW cables include one or more optical fibers within a tubular jacket, which is surrounded by one or more layers of conductive wire helically wound about the tubular jacket. The OPGW cables extend between towers supporting electrical power lines, and connect the towers to earth ground. For the sake of brevity and clarity, however, the first cable 202 and the second cable 204 are described herein as fiber optic cables to describe the present grommets 208 (FIG. 2).

Figure 2:
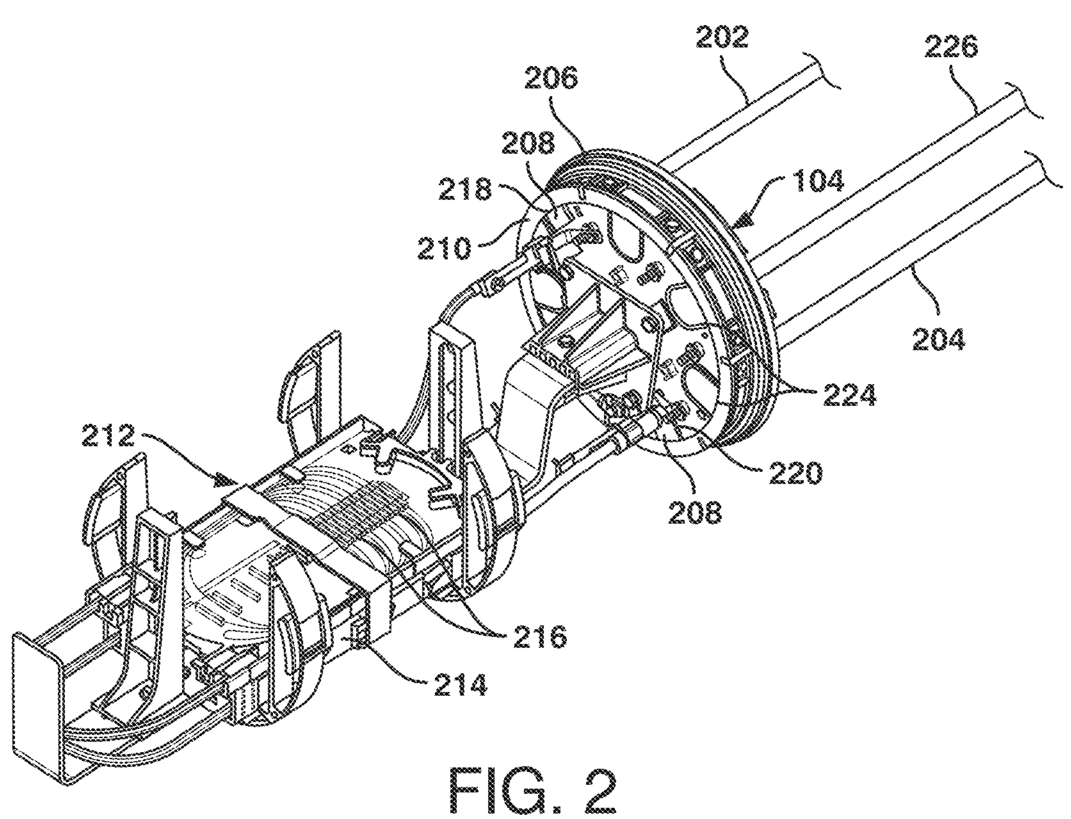
FIG. 2 is a cutaway view showing an organizer that supports a connection between an optical fiber of a first cable and an optical fiber of a second cable, the organizer being coupled to a cap to be installed on a housing of a splice enclosure, wherein the cap includes a plurality of ports including grommets through which cables extend into an interior of the housing.

FIG. 2 is a perspective view of an internal side 210 of the cap 106, coupled to an organizer 212 that supports a connection between the first cable 202 and the second cable 204. While the splice enclosure 100 is assembled, the internal side 210 of the cap 104 faces inwardly, into the interior space defined by the housing 102, where the organizer 212 is supported.

Some embodiments of the organizer 212 include a tray 214 with a plurality of splice grooves 216. The splice grooves 216 include apertures that receive an individual fiber included in the first cable 202 and an individual fiber included in the second cable 204. A connection is established between the individual fibers from the first and second cables 202, 204 received within the respective aperture, allowing fiber optic light signals to be conveyed between the connected fibers.

Some embodiments of the cap 104 include a plurality of ports through which at least a portion of the first cable 202 and the second cable 204 extend into the interior space of the housing 102. For the illustrated embodiment of FIG. 2, a first port 218 is defined by a sidewall 300 (FIG. 3) forming a portion of the cap 104. The first port 218 is an aperture through which the first cable 202, or a portion thereof, extends from an ambient environment, externally of the housing 102, into the interior space of the housing 102. An elastically-compressible grommet 208 forms a seal in the space around the first cable 202 within the first port 218, between an external surface of the first cable 202 and the sidewall 300.

A second port 220 is also defined by a sidewall 302 (FIG. 3) of the cap 104, forming another aperture through which the second cable 204, or a portion thereof, extends from the ambient environment into the interior space of the housing 102. The grommet 208 forms a seal in the space around the second cable 204 within the second port 220, between an external surface of the second cable 204 and the sidewall 302. The seals established by the grommets 208 interfere with the intrusion of a contaminant, debris, or other foreign object into the interior space of the housing 102 through the first and second ports 218, 220.

Some embodiments of the cap 104 also include one or more (e.g., up to eight, or up to six, or up to five, or up to four, etc.) expansion ports 224. The expansion ports 224 correspond to expansion locations, forming apertures at those expansion locations through which at least a third cable 226 extends into the interior space defined by the housing 102. For example, one or more individual fibers included in the third cable 226 is/are configured to be received within a splice groove 216 to establish a connection with one or more fibers of the first cable 202 or the second cable 204.

For some embodiments, a grommet 208 is installed in at least one of the first port 218, the second port 220, or the expansion port(s) 224, to seal the respective port(s) 218, 220, 224. As described in greater detail below, the grommet 208 is installed into the first port 218, for example, by compressing a portion of the grommet 208 an extent that allows the grommet 208 to fit within a perimeter defined by the sidewall 300. The grommet 208 and sidewall 300 dimensions are configured so the grommet 208, when released and allowed to relax within the first port 218, attempts to elastically expand within the first port 218. Expansion of the grommet 208 causes an external periphery 400 (FIG. 4A) of a body 402 (FIG. 4A) that forms a portion of the grommet 208 to make contact with the sidewall 300.

The grommet 208, in an unbiased state as shown in FIG. 4A, is elastically compressible to expand beyond the dimensions of the sidewall 300. Full relaxation of the grommet 208 (e.g., when unbiased, and free from external forces deforming the grommet 208), opens an aperture 404 defined by a collar 406 coupled to the body 402.

Expansion of the grommet 208 within the aperture of the first port 218 defined by the sidewall 300 causes a compressive force 408 to be exerted by the sidewall 300 onto the external periphery 400 of the body 402 provided to the grommet 208, represented by arrows 408 in FIG. 4B. The compressive force 408 maintains compression of the grommet 208 within the aperture, preventing relaxation of the grommet 208 beyond the sidewall 300, and preventing the grommet 208 from returning to the grommet's unbiased size or shape. While the grommet 208 is in the compressed state while installed within the aperture of the first port 218, the collar 406 is deformed, and compressed in a radial direction inward, toward a central axis 506 (FIG. 5) of the aperture 404, thereby closing the aperture 404 as shown in FIG. 4B.

For some embodiments, the aperture 404 is completely closed (i.e., the aperture 404 has a zero diameter) as described herein without a plug being inserted into the aperture 404. In other words, embodiments of the grommet 208 are devoid of a plug, such as a cylindrical member that, when inserted into the aperture 404, would elastically expand the aperture 404 to form a seal preventing the intrusion of water or air into the interior space of the housing 102. Instead, compression of the grommet 208 as described herein causes the aperture 404 to close in on itself, with portions of the collar 406 contacting other portions of the collar 406, to close the aperture 404.

For some embodiments, the aperture 404 may not completely close (i.e., the aperture 404 has a diameter greater than zero). Such embodiments may be useful for use with a cable (e.g., first cable 202, second cable 204, etc.) extending through the aperture 404 and with the collar 406 elastically closed to engage against the cable to form a seal preventing the intrusion of water or air into the interior space of the housing 102.

Some embodiments of the grommet 208 will form a watertight seal by closing the aperture 404 as a result of the compressive force 408 being exerted on the external periphery 400 of the grommet 208 as described herein. For example, some embodiments of the watertight seal support a pool of water on the collar 406 at atmospheric pressure (e.g., 1 atmosphere), preventing the intrusion of the water from the pool into the interior space of the housing 102 through the closed aperture 404.

According to some embodiments, the watertight seal is airtight, preventing the flow of air at atmospheric pressure through the closed aperture 404. Some embodiments of the grommet 208 prevent the flow of air through the closed aperture 404 up to a threshold pressure that is greater than atmospheric pressure. For example, embodiments of the threshold pressure can be at least 20 psi, or at least 25 psi, or at least 30 psi, or at least 35 psi, or at least 40 psi, etc.

It is to be appreciated that additional aspect/features may be included to help provide for the aspect of the watertight seal. Such additional aspect/features are contemplated and within the scope of the present disclosure. For example, according to some embodiments, one or more annular ridges may be provided on the external periphery 400 of the body 402. As another example, according to some embodiments, one or more annular ridges may be provided on the inner surface of the collar 406 at the aperture 404.

For some embodiments of the cap 104, the first port 218 and the second port 220 are generally D-shaped when viewed from the perspective shown in FIG. 3. For such embodiments, the external periphery of the body 402 provided to the grommet 208, when fully relaxed, has a corresponding D-shape. The outside dimensions of the body 402, however, are greater than the inside dimensions of the aperture of the respective first port 218 and second port 220. The body 402 and the collar 406 are formed from elastically-compressible, or otherwise elastically-deformable materials. Within some examples, the body 402 and the collar 406 are made of different materials. Within some examples, the body 402 is made of a material that is relatively harder than the material of the collar 406. In other words, the collar 406 is made of material that is relatively softer than the material of the collar 406. Examples of materials include silicone, or urethane or TPE (thermoplastic elastomer) or TPR (thermoplastic rubber). Such materials may be critical (and not merely a matter of design choice) as they might allow for desired, compression, expansion, malleability, etc. Of course, other materials are contemplated and within the scope of the present disclosure. Accordingly, the grommet 208 can be compressed and installed in the aperture to close the aperture 404 defined by the collar 406, and form the watertight seal as described herein.

It is contemplated and within the scope of the present disclosure that the grommet 208 may be manufactured via various methods. For some embodiments, the body 402 is formed via injection (e.g., liquid injection), compression molding or the like of material into a mold. For some embodiments, the collar 406 is formed via injection (e.g., liquid injection), compression molding or the like of material into a mold. Examples of materials include silicone, or urethane or TPE (thermoplastic elastomer) or TPR (thermoplastic rubber). Such materials may be critical (and not merely a matter of design choice) as they might allow for desired, compression, expansion, malleability, etc. Of course, other materials are contemplated and within the scope of the present disclosure. For some embodiments, the body 402 is formed (e.g., via injection) within a first stage of a mold, and then, subsequently, the collar 406, is formed (e.g., injection) directly against the body 402 within a second stage of a mold. Some different mold parts would be used to form each of the body 402 and the collar 406. Such is a two-step molding process. The two-step molding process would result in the collar 406 being directly bonded to the body 402. Such two-step molding process avoids a need for a separate step of bonding. However, it is within the scope of the present disclosure that separate manufacture (e.g., molding) of the body 402 and the collar 406 may be performed, and subsequently the body and the collar are bonded together.

It is contemplated and within the scope of the present disclosure that the manufacture of the grommet 208 may include various steps, techniques and the like to assist in connection (e.g., bonding) of the body 402 and the collar 406 together. For some embodiments, texturing, undercutting, hollowing, etc. of portion(s) of one or both of the body 402 and the collar 406 at the interface of the body 402 and the collar 406.

For the embodiments of the grommet 208 shown in FIGS. 4A and 4B, the body 402 is formed in an annular shape. For such embodiments, the grommet 208 is to be installed in the aperture of embodiments of the first and second ports 218, 220 having a circular shape. Compression of the grommet 208 according to such embodiments can involve substantially uniform compression of the diameter of the grommet 208 about the entirety of the annular body 402.

It is to be appreciated that the shown example with FIGS. 4A and 4B of the body 402 has a circular external periphery 400. It is to be appreciated that the external periphery 400 may have a different shape. Some examples of different shapes include square, rectangle, oval, etc. In some examples, the shape of the external periphery 400 may be related to the shape of the area into with the grommet 208 is to be placed. Also, in some examples, some portions (e.g., the body 402, the collar 406) of the grommet 208 may have shapes that are different from the respective shapes shown within the example of FIGS. 4A and 4B. Such different shapes of some portions (e.g., the body 402, the collar 406) may be associated with the different shape of the external periphery 400.

Some embodiments of the body 402 are formed from an elastically-compressible, or otherwise elastically-deformable material such as a thermoplastic or thermosetting polymer or co-polymer, for example. Some embodiments of the collar 406 are also formed from an elastically-compressible, or otherwise elastically-deformable material such as a thermoplastic or thermosetting polymer or co-polymer, for example. Examples of materials include silicone, or urethane or TPE (thermoplastic elastomer) or TPR (thermoplastic rubber). Such materials may be critical (and not merely a matter of design choice) as they might allow for desired, compression, expansion, malleability, etc. Of course, other materials are contemplated and within the scope of the present disclosure. The body 402 and collar 406 can be formed from the same material, or different materials, each with compression or deformation properties to close the aperture 404, without requiring a plug, as described herein as a result of installation of the grommet 208 into the first port 218 or the second port 220. Within some examples, the inside (e.g., collar) is of a relatively softer and/or relatively less rigid material and the outside (e.g., body) is of a relatively harder and/or relatively more rigid material. Within some examples, TPR may be used for the outside (e.g., body) and TRE may be used for the inside (e.g., collar). Such materials may be critical (and not merely a matter of design choice) as they might allow for desired, compression, expansion, malleability, etc. Of course, different combinations are contemplated and within the scope of the present disclosure.

The material from which the body 402 and the collar 406 are formed are independently selectable to afford the body 402 and the collar 406 with desired physical properties. For example, the material from which the collar 406 is formed has a rigidity that is less than a rigidity of the material from which the body 402 is formed according to some embodiments. As a result, compression of the body 402 within the aperture of the first port 218, for example, causes greater deformation of the collar 406 than the body 402. For such embodiments, the compressive force imparted on the external periphery 400 of the body 402 is transmitted to the collar 406, causing closure of the aperture 404 defined by the collar 406 as described herein.

Figures 5, 6:
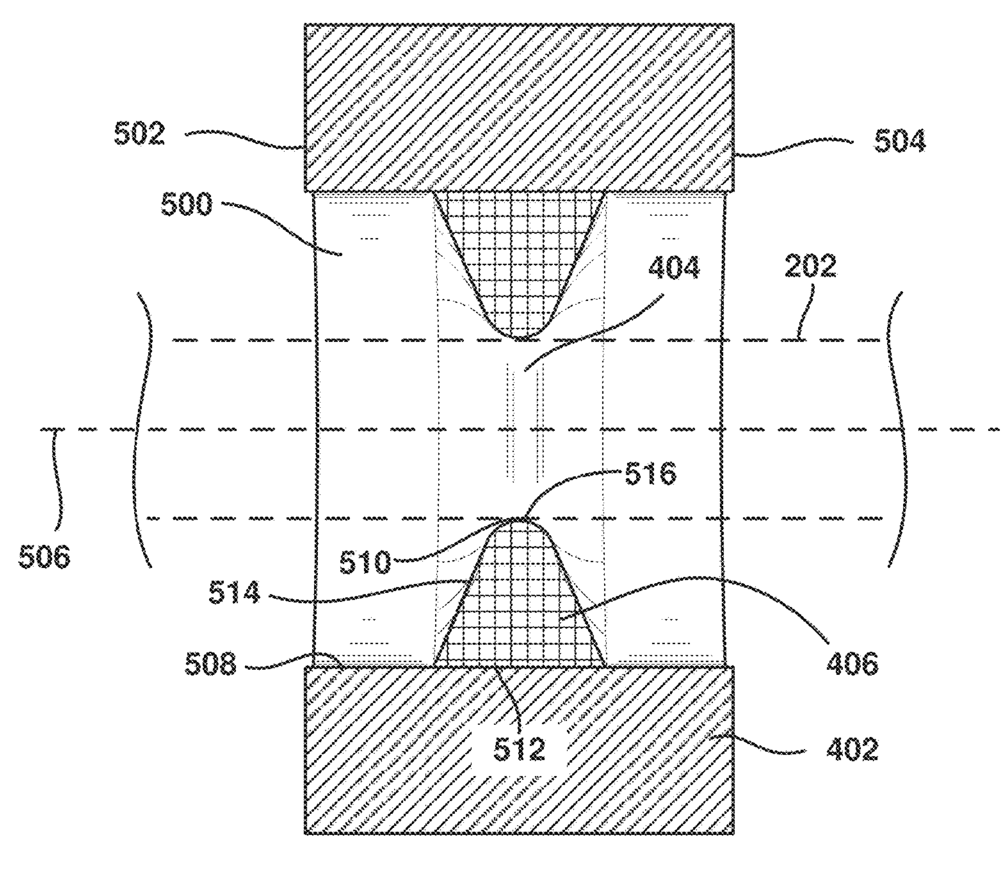
FIG. 5 is a cross-sectional view of the grommet of FIG. 4A taken along line 5-5 in FIG. 4A.
FIG. 6 is a perspective view of an embodiment of a cap for a splice enclosure including at least one port configured to receive a grommet having a rectangular cross section.

Regardless of the shape of the body 402, the body 402 defines a passage 500, shown in cross-section as a cylindrical passage in FIG. 5, that extends from a first end 502 of the body 402 to a second end 504 of the body 402. The passage forms a path through the grommet 208 through which the first cable 202 (represented using broken lines in FIG. 5), for example, can extend from the ambient environment of the splice enclosure 100 into the interior passage of the housing 102 along the axis 506. For some embodiments, the axis 506 is also a longitudinal axis, or parallel with a direction that the passage 500 extends in the axial direction between the first end 502 and the second end 504.

The collar 406 defines the aperture 404 that is closable as a result of compression or other deformation of the grommet 208 as described herein. The collar is deformable to receive the first cable 202, for example, within the aperture 404 while the grommet 208 is installed within the passage 500 defined by the body 402 to seal an interface 510 between the collar 406 and an external surface of the first cable 202. For some embodiments, the interface 510 is sealed to be watertight or airtight, as such seals are described above.

According to some embodiments, the collar 406 includes a base 512 that is coupled to a sidewall 508, or interior periphery of the body 402 defining the passage 500 extending through the body 402. For example, the material from which the collar 406 is formed is chemically bonded to the sidewall 508 as part of a two-component injection molding process. For some embodiments, the collar 406 is adhered to the sidewall 508 by an adhesive. For some embodiments, the collar 406 is integrally formed as part of a monolithic structure including the body 402.

It is contemplated that the collar 406 may be coupled, attached, or the like to the body 402 via various other arrangements/constructions. Such other arrangements/constructions for coupling, attachment, etc. are within the scope of the present disclosure. For example, the sidewall 508 may include structures and/or texturing to provide for contact retention efficiency (e.g., purchase) of the base 512 to the sidewall 508. For such, the material of the collar 406 may inter-engage with the structures and/or texturing. As another example, the sidewall 508 may include grooves, indentations or the like into the body 402 for contact efficiency (e.g., purchase) of the base 512 to the sidewall 508. Such grooves, indentations or the like may include dovetails, undercuts, shelves or similar. Such dovetails, undercuts, shelves or similar may provide relatively smaller cross-sectional areas at inward (i.e., toward the axis 506) and thus relatively larger cross-sectional areas away from the axis 506. For such, the material of the collar 406 may extend the grooves, indentations or the like. Contact retention efficiency (e.g., purchase) of the base 512 to the sidewall 508 is provided by such. For examples in which the collar 406 is formed via use of flowing liquid, such flowing liquid can flow into engagement, around or into, as needed, to the structures, texturing, dovetails, undercuts, shelves or similar. For examples in which the collar 406 is formed via use of pressing/pressure/compression, such pressing/pressure/compression may cause movement of material into engagement, around or into, as needed, to the structures, texturing, dovetails, undercuts, shelves or similar.

Some embodiments of the collar 406 include a tapered region 514 that extend between the base 512 and a peak region 516 that establishes the interface 510 between the collar and the first cable 202, for example, extending through the grommet 208. The surface area of the base 512 in communication with the sidewall 508, according to some embodiments, is greater than a surface area of the peak region 516 that contacts the external surface of the first cable 202 extending into the interior space defined by the housing 102. Such embodiments allow for greater flexibility and expansion, compression, or other deformation of the collar 406 adjacent to the peak region 516 than a region of the base 512.

To facilitate installation of the grommet 208 within an aperture after a cable has been extended through the first port 218, for example, the body 402 and collar 406 can be discontinuous. For example, as shown in FIGS. 4A and 4B, the body 402 and the collar 406 include a break 410, where opposing grommet segments 412A and 412B are elastically separable from each other. Thus, the grommet 208 can be placed around the first cable 202, for example, extending into the housing 102 and installed in the first 218 port to seal the space between the sidewall 300 defining the first port 218 and the first cable 202.

It is to be appreciated that in accordance with an aspect, use of the grommet 208 within a respective port (e.g., the first port 218, second port 220, etc.) provides for sealing. The sealing is provided if a respective cable (e.g., first cable 202, second cable 204, etc.) does not extend through the grommet 208 and respective port (e.g., the first port 218, second port 220, etc.) via the aperture 404 of the grommet 208 being completely closed (i.e., the aperture 404 has a zero diameter). As such, there is no need for any additional item (e.g., a plug) to achieve the sealing. The sealing is provided if a respective cable (e.g., first cable 202, second cable 204, etc.) does extend through the grommet 208 and respective port (e.g., the first port 218, second port 220, etc.) via the aperture 404 of the grommet 208 being closed to the diameter of the respective cable. Specifically, the collar 406 seals against the respective cable.

It is to be appreciated, that some cables (e.g., first cable 202, second cable 204, etc.) may have a relatively small diameter and that some cables may have a relatively large diameter. It is contemplated, that cable (e.g., first cable 202, second cable 204, etc.) with a relatively smaller diameter may easily cooperate with the example shown within FIGS. 4A and 4B, and the ability to completely close the aperture if the cable is not present. However, it is contemplated that cable (e.g., first cable 202, second cable 204, etc.) with a relatively larger diameter may not easily cooperate with some examples, possibly such as the example shown within FIGS. 4A and 4B. For example, the diameter of cable (e.g., first cable 202, second cable 204, etc.) may be larger than an aperture 404 that could be obtained when the grommet 208 is in the state shown in FIG. 4B.

It is to be noted that the cables (e.g., first cable 202, second cable 204, etc.) may each have a diameter that may be varied as mentioned above. It is to be appreciated that the grommet 208 may have one or more dimensions so as to accommodate cables (e.g., first cable 202, second cable 204, etc.) having such variance of diameter. Moreover, it is to be note that multiple grommets 208, each having one or more variations of dimensions may be provided and/or made available. As such a specific grommet 208, which has dimension(s) to accommodate a cable (e.g., first cable 202, second cable 204, etc.) having a particular dimension, can be selected and utilized. For example, if a relatively large diameter cable (e.g., first cable 202, second cable 204, etc.) is being used, then a grommet 208 may be selected, from a plurality of available options, to provide for the cooperation of the cable with the grommet. Also, if a relatively small diameter cable (e.g., first cable 202, second cable 204, etc.) is being used, then a grommet 208 may be selected, from a plurality of available options, to provide for the cooperation of the cable with the grommet. Further, if no cable is being used at a particular location, then a grommet 208 as shown in FIG. 4B and that has the construction/configuration such that the aperture is zero for sealing, may be selected. As an example, a first grommet 208 may be configured to have a range of 0 to approximately 0.5 inch for the aperture 404 and thus for accommodation of a cable (e.g., first cable 202, second cable 204, etc.) having a diameter of approximately 0 to approximately 0.5 inch, and another a second grommet 208 may be configured to have a range of approximately 0.5 inch to approximately 1 inch for the aperture 404 and thus for accommodation of a cable (e.g., first cable 202, second cable 204, etc.) having a diameter of approximately 0.5 inch to approximately 1 inch. Another example is a range of 400 thousands of an inch to 1 inch. It is also contemplated that the possible range may be greater. For example, it is contemplated that the range may be approximately 0 to approximately 1 inch. Such dimensions may be critical (and not merely a matter of design choice) as they might allow for desired, compression, expansion, malleability, etc. However, even greater ranges are contemplated. As such, specific ranges need not be specific limitations upon the present disclosure. Again, selection between/among available grommets 208 may be based upon the size of a cable (e.g., first cable 202, second cable 204, etc.) that is to extend through the grommet.

It is to be appreciated that some examples of the grommet 208 may be constructed/configured to accommodate a relatively large range of cable diameters. For example, it is contemplated, and thus within the scope of the present disclosure, that materials (e.g., foam-type materials) may be selected that provide for a relatively large elastic range of movement and such will accept and provide seal to a relatively large range of cable diameters. It is contemplated that a larger outer diameter of the external periphery 400 may be a factor to obtain a greater range of possible size of cable. Of course, a larger outer diameter of the external periphery 400 would be associated with a larger size port (e.g., first port 218) of the cap 104. Such dimensions may be critical (and not merely a matter of design choice) as they might allow for desired, compression, expansion, malleability, etc.

As another example, different material and/or construction/configuration for the portion of the body 402 that encircles the collar 406 may provide for a relatively greater amount of movement of the collar. Such would thus provide for acceptance and provision of seal to a relatively large range of cable diameters. Some examples of such different material for the portion of the body 402 include softer, more resilient material. Some examples different construction/configuration for the portion of the body 402 include a hollow O-ring, honeycomb, closed cell technology (e.g., via injection of air or $CO_2$ during a molding process).

As another example, the body 402 and/or the collar 406 may include multiple, and different, layers or levels of softness/resilience. Such would permit a greater range of cable diameters to be placed therein. The different layers/levels would provide for engagement and thus sealing relatively small diameter cables. However, relatively larger diameter cables may be received therein, albeit with great resistance and thus pressing to seal as successive layers/levels are compressed.

It is to be appreciated that, if multiple, different grommets 208 are provided/available, it is contemplated that the different grommets may have different identifiers/indicia to aid the user (e.g., a technician) to select an appropriate grommet (i.e., different size). The different grommets 208 may be of different color. The different grommets 208 may have different printing, engravings or the like.

It is to be appreciated that the provision of multiple grommets 208 (e.g., of different sizes) may be provided as a kit. It is to be appreciated that the kit may include other object(s), device(s) and the like that may provide for efficient utilization of the grommets 208. For example, a device for measuring to help select an appropriate grommet 208 may be provided within the kit.

Figures 7A, 7B:
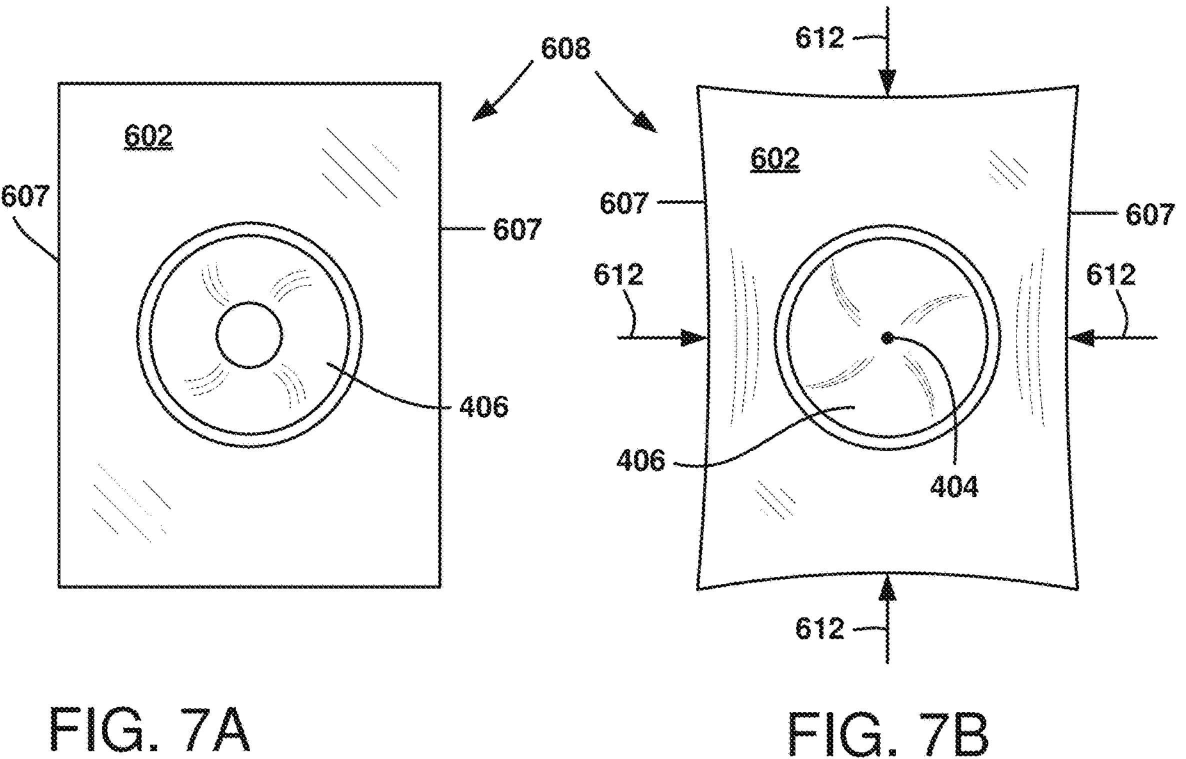
FIG. 7A is an end view of the embodiment of the grommet having the rectangular cross section shown in FIG. 6, separated from the cap and in an unbiased state.
FIG. 7B is an end view of the embodiment of the grommet of FIG. 7A, with a passage extending through the grommet closed as a result of compression of the grommet while the grommet is installed in the port as shown in FIG. 6.

Some embodiments of the body 402 described above have a circular shape, as shown from the perspective of FIGS. 4A and 4B, for example. However, the present disclosure is not so limited. Some embodiments of the grommet 208 include a body 602 having a rectangular external shape, as shown in FIGS. 6, 7A and 7B. The rectangular body 602 is to be received within a first port 618 formed in another embodiment of a cap 604, defining a rectangular aperture as shown in FIG. 6, for example. The sidewall 600 defining the first port 618 includes linear segments 605 that extend along lateral sides 607 of the rectangular body 602.

In some embodiments, the grommet 208 may have more than one aperture 404. FIG. 6 shows one example, at the left side of the figure, of the grommet having more than one aperture. The shown example provides two apertures. Of course, any number is possible and contemplated. As some examples are 6 apertures, or 9 apertures, or 24 apertures, etc. that may be provided. Again, any number may be utilized.

Similar to the preceding embodiments, the body 602 defines a passage 610 through which the first cable 202, for example, is to extend into the interior space defined by the housing 102. As shown in FIGS. 7A and 7B, the collar 406 is provided within the passage 610 defined by the body 602. The collar 406 is similar to the embodiments described above, so further details about the collar 406 here are omitted.

According to some embodiments, a cover is installed on the cap 604, sandwiching the grommet 608 between the cover and the cap 604, exerting a compressive force, represented by arrows 612 in FIG. 7B, on the grommet 608. Due to the lateral support afforded by the sidewalls 605 to the lateral sides 607 of the body 602, the lateral sides 607 are prevented from bowing outward, away from the passage 610. Instead, the collar 406 is deformed as a result, thereby closing the aperture 404 as shown in FIG. 7, and sealing the passage 610 as described elsewhere herein.

It is to be appreciated that another device, such as a plug, a dumbbell, a cylindrical, could be utilized the grommet 208. Such device may be inserted into the grommet 208. Such insertion of another device may provide a blocking/plugging function if no cable is associated within the grommet 208. Also, it is to be appreciated that, such other device may be constructed/configured to cooperate with a cable. For example, the device may include hole for smaller cable. Also, if there are multiple passages, such as shown within the example of FIG. 6, cable(s) may extend through some (e.g., one) of the passages and devices (e.g., plug, etc.) may be placed in the remainder of the passages. It is contemplated that use of a plug, a dumbbell, a cylindrical, or the like may be dependent upon the size range of the aperture 404. For example, if the size range of the aperture 404 is such that the aperture 404 may seal (e.g., reach zero diameter) if a cable is absent, then a plug, a dumbbell, a cylindrical, or the like may be unnecessary to obtain sealing. However, if the size range of the aperture 404 is such that the aperture 404 may not seal (e.g., not reach zero diameter) if a cable is absent, then a plug, a dumbbell, a cylindrical, or the like may be useful to help provide for sealing. It is to be noted that if every occurrence of a port (e.g., first port 218) and grommet (e.g., grommet 208) has a respective cable extending therethrough, the need for the grommet (e.g., grommet 208) to have a range wherein the aperture (e.g., aperture 404) that may reach to 0 (zero) and/or the use of a plug, a dumbbell, a cylindrical, or the like is lessened or possibly obviated. For example, if it is know that a cable will always be present, a grommet that has a range of 400 thousands to 1 inch could be used. Such shapes, arrangements, considerations, etc. may be critical (and not merely a matter of design choice) as they might allow for desired, compression, expansion, malleability, etc. Of course, other examples are contemplated and with the scope of the present disclosure.

Figure 8:
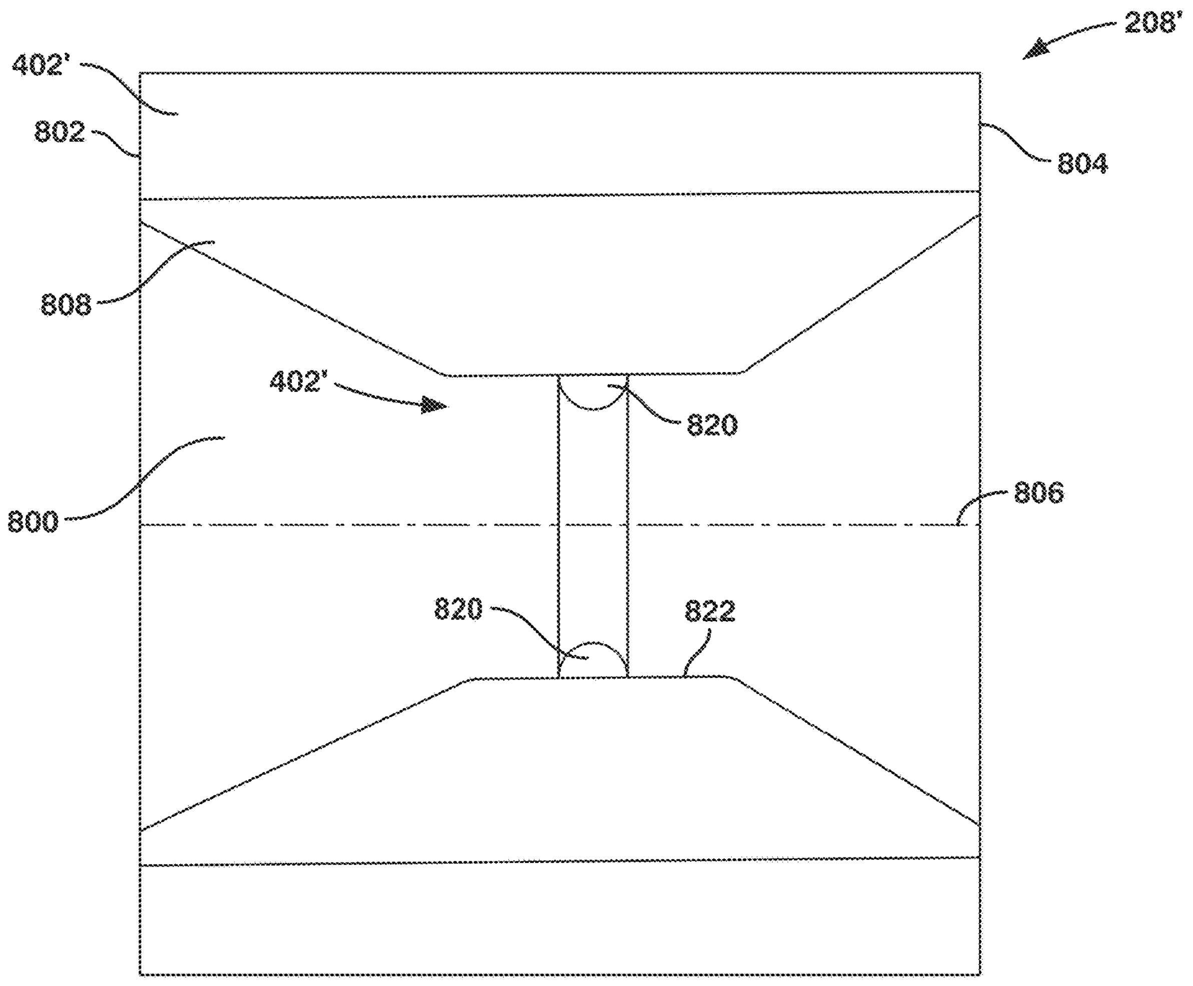
FIG. 8 is a view similar to FIG. 5 for another example grommet that includes some example additional features.

FIG. 8 is a view similar to FIG. 5 for another example grommet 208' that includes some example additional features. For this example also, regardless of the shape of the body 402', the body 402' defines a passage 800, shown in cross-section as a generally cylindrical passage in FIG. 8, that extends from a first end 802 of the body 402' to a second end 804 of the body 402'. The passage forms a path through the grommet 208' through which a cable can extend from the ambient environment of the splice enclosure 100 into the interior passage of the housing 102 along an axis 806.

A collar 808 defines an aperture 404' that is closable as a result of compression or other deformation of the grommet 208' generally similar as described herein. In general, the collar 808 is deformable to receive the cable, for example, within the aperture 404' while the grommet 208' is installed within the passage 800 defined by the body 402' to seal an interface between the collar 808 and an external surface of the cable. For some embodiments, the interface is sealed to be watertight or airtight, as such seals are described above.

According to some embodiments, including the example shown within FIG. 8, at least one inner, smaller radial rib 820 is provided at an inner portion of the collar 808. The collar 808 may have a flatted annular inner face 822 upon which the rib 820 is located. The rib 820 may help with sealing. For example, the rib may help with sealing during use with smaller diameter cable. Such may help expand the range of cable diameters that may be used and sealed via the example grommet 208'.

It is to be appreciated that currently, a relatively large number of different grommet types, each type having different aperture size, are needed to accommodate many different cable sizes. The present disclosure obviates the need for so many different size types. It is worth noting that with the disclosed abilities of the grommets of the present disclosure, it may be possible that a smaller number of grommets types, each having a different range size range of the aperture needs to be available. So, a technician need only ensure that they have sufficient amounts of the smaller number of different size-range grommets.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A grommet for sealing a first aperture formed in a splice enclosure to receive a cable extending into the splice enclosure, the grommet comprising:

a body formed from a first material that is receivable within the first aperture formed in the splice enclosure, the body being sized to be subjected to a compressive force exerted by a sidewall of the splice enclosure defining the first aperture while the grommet is installed within the first aperture, wherein the body defines a passage extending through the body from a first end of the body to a second end of the body; and a collar formed from a second material, different than the first material, coupled to a sidewall of the body defining the passage, the collar defining a second aperture extending through the collar from a first end of the collar to a second end of the collar, wherein the second aperture is closed to a zero diameter while the cable is not received within the second aperture as a result of the compressive force exerted by the sidewall of the splice enclosure, wherein the collar is deformable from the zero diameter to receive the cable within the second aperture while the grommet is installed within the first aperture to seal an interface between the collar and the cable.

2. The grommet of claim 1, wherein a rigidity of the second material forming the collar is less than a rigidity of the first material forming the body, allowing a portion of the collar to be compressed in a radial direction, relative to a central axis of the second aperture, as a result of receiving the cable within the second aperture while the grommet is installed in the first aperture defined by the splice enclosure.

3. The grommet of claim 1, wherein the collar is deformable to seal the interface between the collar and a non-cylindrical exterior surface of the cable.

4. The grommet of claim 1, wherein the second aperture defined by the collar is cylindrical, and the collar is deformable to close the second aperture in a radial direction relative to an axis of the second aperture extending in a direction parallel to an axis of the body, the axis of the body extending between the first end of the body and the second end of the body.

5. The grommet of claim 1, wherein the second aperture is closed to have the zero diameter to form a water-tight seal at atmospheric pressure as a result of the compressive force.

6. The grommet of claim 1, wherein the collar comprises a base coupled to an interior surface defining a portion of the passage defined by the body, and a tapered region extending between the base and a peak region disposed radially inward of the interior surface.

7. The grommet of claim 1, wherein the collar includes an inner radial rib.

8. A splice enclosure comprising:

a housing defining an interior space;

a cap provided to the housing to seal the interior space, wherein the cap defines a first aperture through which a cable extends between an ambient environment and the interior space; and a grommet that seals a space between a sidewall of the cap that defines the first aperture and an exterior surface of the cable extending into the interior space, wherein the grommet comprises:

a body having an external periphery that is receivable within the first aperture, the external periphery of the body being sized to be subjected to a compressive force exerted by the sidewall of the cap while the grommet is installed within the first aperture, wherein the body defines a passage extending through the body from a first end of the body exposed to the ambient environment to a second end of the body exposed to the interior space while the grommet is installed within the first aperture, and a collar coupled to a sidewall of the body defining the passage, the collar defining a second aperture extending through the collar from a first end of the collar to a second end of the collar, wherein the second aperture is closed to form a water-tight seal at atmospheric pressure while the cable is not received within the second aperture as a result of the compressive force exerted by the sidewall of the cap, wherein the collar is deformable to receive the cable within the second aperture while the grommet is installed within the first aperture to seal an interface between the collar and the cable.

9. The splice enclosure of claim 8, wherein the body is formed from a first material and the collar is formed from a second material, different from the first material, and a rigidity of the second material is less than a rigidity of the first material, allowing a portion of the collar to be compressed in a radial direction, relative to a central axis of the second aperture as a result of the cable being received within the second aperture.

10. The splice enclosure of claim 8, wherein the collar is deformable to seal the interface between the collar and a non-cylindrical exterior surface of the cable.

11. The splice enclosure of claim 8, wherein:

the body has a body thickness between the first end of the body and the second end of the body, the collar has a collar thickness between the first end of the collar to the second end of the collar, and the collar thickness is less than the body thickness.

12. The splice enclosure of claim 8, wherein the second aperture is closed to a zero diameter to form the water-tight seal.

13. The splice enclosure of claim 8, wherein the collar comprises a base coupled to an interior surface defining a portion of the passage defined by the body, and a tapered region extending between the base and a peak region disposed radially inward of the interior surface.

14. The splice enclosure of claim 8, wherein the body comprises a rectangular cross-sectional shape, and the passage is cylindrical, extending through the body.

15. A splice enclosure comprising:

a housing defining an interior space;

a cap provided to the housing to seal the interior space, wherein the cap defines a first aperture leading from an ambient environment to the interior space;

a cable extending through the first aperture between the ambient environment and the interior space; and a grommet installed within the first aperture to seal a space between an external surface of the cable and a sidewall of the cap defining the first aperture, the grommet comprising:

a body having an external periphery that is subjected to a compressive force exerted by the sidewall of the cap, wherein the body defines a passage extending through the body from a first end of the body exposed to the ambient environment to a second end of the body exposed to the interior space, and a collar coupled to a sidewall of the body defining the passage, wherein the collar defines a second aperture extending through the collar from a first end of the collar to a second end of the collar, wherein the second aperture closes as a result of the compressive force exerted by the sidewall of the cap and is deformed to receive the cable and seal an interface between the external surface of the cable and a sidewall of the collar defining the second aperture, wherein the body has a body thickness between the first end of the body and the second end of the body, the collar has a collar thickness between the first end of the collar to the second end of the collar, and the collar thickness is less than the body thickness.

16. The splice enclosure of claim 15, wherein the body is formed from a first material and the collar is formed from a second material, different from the first material, and a rigidity of the second material is less than a rigidity of the first material, allowing a portion of the collar to be compressed in a radial direction, relative to a central axis of the second aperture as a result of the cable being received within the second aperture.

17. The splice enclosure of claim 15, wherein the collar is deformable to seal the interface between the collar and a non-cylindrical exterior surface of the cable.

18. The splice enclosure of claim 15, wherein the second aperture defined by the collar is cylindrical, and the collar is deformable to close the second aperture in a radial direction relative to an axis of the second aperture extending in a direction parallel to an axis of the body, the axis of the body extending between the first end of the body and the second end of the body.

19. The splice enclosure of claim 15, wherein the second aperture is closed to form a water-tight seal at atmospheric pressure as a result of the compressive force.

20. The splice enclosure of claim 15, wherein the collar comprises a base coupled to an interior surface defining a portion of the passage defined by the body, and a tapered region extending between the base and a peak region disposed radially inward of the interior surface.

* * * * *